T. Smith,
Wheelwrights' Machine.
No. 82,649. Patented Sep. 29, 1868.
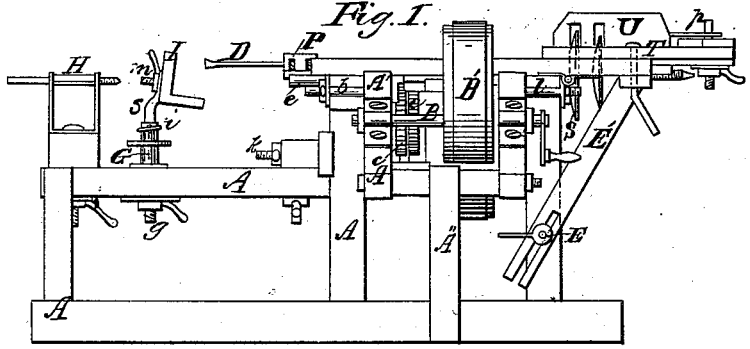

United States Patent Office.

THOMAS SMITH, OF CALIFORNIA, MISSOURI.

Letters Patent No. 82,649, dated September 29, 1868.

IMPROVEMENT IN SAWING AND BORING-MACHINES.

*The Schedule referred to in these Letters Patent and making part of the same.*

TO ALL WHOM IT MAY CONCERN:

Be it known that I, THOMAS SMITH, of California, in the county of Moniteau, and State of Missouri, have invented a new and improved Combined Sawing, Planing, Turning, and Boring-Wood Machine; and I do hereby declare that the following is a full, clear, and exact description of the construction and operation of the same, reference being had to the annexed drawings, making a part of this specification, in which—

Figure 1 is a side elevation.

Figure 2 is a top view.

This invention is designed particularly for use in the carriage-shop, and consists of a combination of parts, by which all the various operations of sawing, planing, turning, and boring the material of which the wheels and other parts of carriages are constructed, can be performed by a single machine, thereby saving great expense, economizing room, and operating more conveniently than when several machines are employed.

In the drawings—

A A represent parts of the frame of my machine.

B is the driving-wheel, which may be operated by any power.

A' is an adjustable and detachable part of the frame A, serving to support the driving-wheel and shaft.

$b\ b$ are bolts and nuts, by which the part A' can be attached and removed, or extended and retracted, so as to adjust the tension of the belt B', and the position of the driving-shaft and wheel.

The inner end of the part A' is pivoted on the bolts $b\ b$, so that the outer end can be raised or depressed, to further adjust the position of the wheel and shaft, if desired; and a folding leg, A'', may be employed to support the outer end at any required elevation.

C is a mandrel or arbor, rotated by the belt B, which carries, at one end, two concavo-convex or dishing saws S S, and at the other end, a planer, P, in the extremity of which is a socket, to receive and hold the tang of the bit or lathe-spindle D.

The two dishing saws S S are arranged on the same mandrel, within a few inches of each other, so as to run concentrically. Their upper edges project up through a table, T, upon which is a swinging plate or carriage-table, U, pivoted at the centre of the circle of which a horizontal section of the saws would form an arc, and provided with two slots $s\ s$, in which the saws S S run, and which also form arcs of said circle.

This plate or carriage-table swings horizontally on its pivot $p$, in such a manner that the saws traverse the curved slots $s\ s$ from end to end. The pivot $p$ is made adjustable towards or from the saws. The object of this arrangement is to enable the carriage-maker to saw out the felloes of his wheels rapidly, with a single application of the wood to the saws.

The table T is itself supported upon two beams E E, hinged at $e$, to the frame A, in such a manner that their outward ends will drop down to any required inclination.

The supporting-legs E' E', that sustain the outer ends of the beams E E, are slotted, and fixed in position by set-screws $e'\ e'$, by which means they can be adjusted to suit the inclination required to be given to the table T.

It is necessary that these provisions should be made, in order to accommodate the machine to the use of differently-dishing saws, for the purpose of sawing out the felloes of larger or smaller wheels. The larger the curve of the saw, the more nearly horizontal the table T must be adjusted, in order to work properly.

On the opposite end of the mandrel, the planer P is arranged, as usual, and in connection with it is a feed-apparatus, $c\ c$, worked from the mandrel by means of suitable gearing, and provided with regulating and adjusting-devices of any convenient form.

G is a hollow standard, in which is stepped the leg of the lathe-rest or that of the boring-table I, and H is the tail-stock.

When the boring-table is used, its leg or standard J is inserted in the top of the hollow standard G, and fixed in any horizontal position by means of a set-screw, $i$.

The table itself can be adjusted at any inclination by means of a vertical slot in one end of it, and a set-screw, shown at *m*.

The outer end of the bed L is pivoted to the frame A, or to standards resting upon or fixed to it, in such a manner that its inner end can be elevated or depressed at will, and the auger be made to enter the wood at any inclination; and the elevation of its inner end may be adjusted by means of slots, bolts, and nuts, shown at *k*. The position of the rest G on the bed L may be changed and adjusted in the same manner, by similar devices, shown at *g*.

Having thus described my invention, what I claim as new, and desire to secure by Letters Patent, is—

1. The pivoted carriage-table U, provided with two curved slots *s s*, and operating in combination with two concavo-convex saws, substantially as and for the purpose described.

2. In combination with the above, the inclined and adjustable table T, pivoted at *e*, and operating substantially in the manner and for the purposes specified.

3. The adjustable, attachable, and detachable support A', for the driving-shaft and wheel, when provided with the swinging leg A'', and so pivoted to the frame A of the machine that its outer end can be elevated or depressed at pleasure, substantially as and for the purpose specified.

To the above specification of my improvement, I have signed my hand, this 16th day of January, 1868.

THOMAS SMITH.

Witnesses:
  CHAS. A. PETTIT,
  SOLON C. KEMON.